May 14, 1957     D. C. BLANCHARD     2,792,088
WEATHER STRIPPING FOR CLOSURE DEVICES
Filed May 28, 1954

INVENTOR.
Donn C. Blanchard
BY
ATTORNEY

United States Patent Office 2,792,088
Patented May 14, 1957

2,792,088

WEATHER STRIPPING FOR CLOSURE DEVICES

Donn C. Blanchard, Miami, Fla., assignor, by mesne assignments, to Stanley Building Specialties Company, a corporation of Florida Application May 28, 1954, Serial No. 433,046

1 Claim. (Cl. 189—65)

This invention relates in general to improvements in closures, and more particularly to improvements in weather stripping for closures.

An important object of this invention is to provide an improved weather stripping element which is so shaped whereby the weather stripping element retains its normal effectiveness throughout continued use.

Another object of this invention is to provide a weather stripping element having a tongue portion disposable between members to be sealed, the tongue portion being carried by a body portion seated in one of the members and projecting away therefrom, the tongue member being resilient and initially engageable with the other of the members.

Still another object of this invention is to provide an improved weather stripping element which is so formed whereby it may be easily pulled into place, the weather stripping element being of a shape whereby it may be readily extruded so that the manufacture and use of the weather stripping element is economically feasible.

A further object of this invention is to provide a weather stripped juncture between a pair of members, the members having disposed therebetween a weather stripping element in sealed engagement therewith, the weather stripping element being so formed and so related to the members whereby attempted passage of air between the members results in the increase of sealing pressure between the weather stripping element and the members.

With the foregoing and other objects in view, which will become more apparent as the nature of the invention is better understood, the same embodies novel features of construction, combination and arrangement of parts as will be hereinafter more full described, illustrated in the accompanying drawings and defined in the appended claims.

Figure 1:
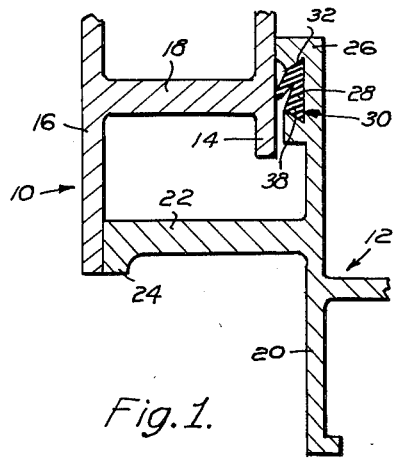
Figure 1 is a transverse horizontal sectional view taken through the juncture of a sash stile and a frame jamb and shows the weather stripping element in a sealed juncture forming position.
Figure 2:
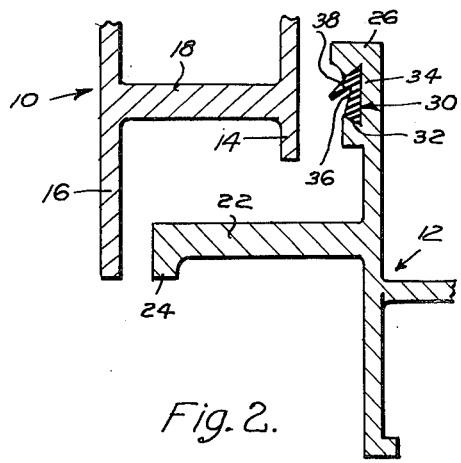
Figure 2 is a sectional view similar to Figure 1 and shows the sash moved to a partially open position.

Referring now to the drawings in detail, it will be seen that there is illustrated in Figures 1 and 2 the relationship between a sash stile 10 and a frame jamb 12. The stile 10 includes an inner flange 14 and an outer flange 16 disposed in spaced relation and secured together by a web 18. It is to be noted that the outer flange 16 is wider than the inner flange 14 and projects beyond the end thereof.

The frame jamb includes a web 20 disposed in generally parallel relation to the flanges 14 and 16. Projecting outward from a central portion of the web 20 is a flange 22 which terminates in a lip 24.

The web 20 is provided with an outwardly directed enlargement 26 in alignment with the flange 14. The enlargement 26 is provided with a vertically extending groove 28 which is preferably of a dovetail shape and which opens outwardly. Seated in the groove 28 is the weather stripping element which is the subject of this invention, the weather stripping element being referred to in general by the reference numeral 30.

The weather stripping element 30 includes a generally wedge shaped body portion 32 which has a wide base 34 and a narrow face 36. Formed integrally with the face 36 along one edge thereof is a tongue portion 38. The tongue portion 38 is disposed in angular relation to the face 36 and is in spaced overlying relation thereto. The tongue portion 38 is of a length to be yieldingly urged into the groove 28 as the same is engaged by a metallic surface or like such as shown in Figure 1.

The weather stripping element 30 is preferably formed of a resilient rubber product or a suitable plastic and is snapped, pulled endwise or otherwise directed into the groove 28. When the weather stripping 30 is properly positioned, the tongue portion 38 is projecting towards the flange 14 and as the sash, of which the sash stile 10 is a part, swings towards a closed position, the flange 14 initially engages the tongue portion 38 and moves it into the groove 28 as flange 14 engages the outer surface of the projection 26 to form a seal therewith, as is illustrated in Figure 1, this seal being a metal to metal contact of flange 14 with enlargement 26 immediately adjacent both sides of element 30 and a weatherstripping contact of tongue portion 38 with flange 14.

It is to be noted that the tongue portion 38 is directed towards the exterior of the sash and in opposite direction to normal attempted flow of incoming air. The incoming air has a tendency to spread or flex the tongue portion 38 away from the base portion 32 and thereby increase the seal between the weather stripping element 30 and the flange 14 and the projection 26.

Figure 3:
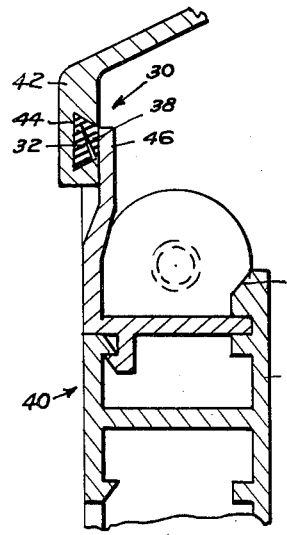
Figure 3 is a vertical sectional view taken through a drip flange and a sash rail and shows the weather stripped juncture therebetween.
Figure 4:
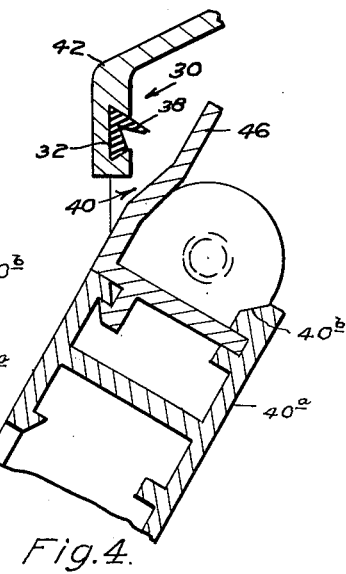
Figure 4 is a sectional view similar to Figure 3 and shows the sash moved to an open position.

Referring now to Figures 3 and 4, it will be seen that the weather stripping element 30 is used to form a sealed joint between a sash rail 40 and a drip flange 42. The drip flange 42 is provided on the inner side thereof with an inwardly opening groove such as, for example a dove tail shaped groove 44 in which is seated the weather stripping element 30. The sash rail 40 includes an uppermost flange 46 which is disposed inwardly of the drip flange 42 in overlapping relation. The tongue portion 38 of the weather stripping element 30 is disposed between the lower portion of the drip flange 42 and the upper portion of the flange 46 and forms a seal therebetween.

Figure 5:
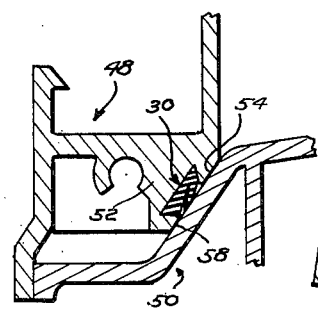
Figure 5 is a vertical sectional view taken through a sash rail and a frame sill and shows the sealed juncture therebetween.
Figure 6:
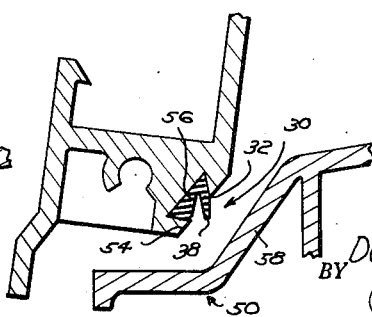
Figure 6 is a sectional view similar to Figure 5 and shows the sash in a partially open position.

Referring now to Figures 5 and 6 in particular, it will be seen that the weather stripping element 30 is utilized to form a sealed joint between a sash rail 48 and a frame sill 50. The sash rail 48 includes a downwardly and inwardly projecting portion 52 having a downwardly and inwardly facing surface 54. Formed in the portion 52 and opening through the surface 54 is a groove, for example a dove tail shaped groove 56. Seated in the groove 56 is the base portion 32 of the weather stripping element 30.

The frame sill 50 is provided with an intermediate flange 58 which is disposed in opposed relation to the surface 54. The tongue portion 38 of the weather stripping element 30 is disposed to have contacting engagement with the flange 58, while the surface 54 is adapted to have a metal to metal engagement with the flange 58.

Figure 7:
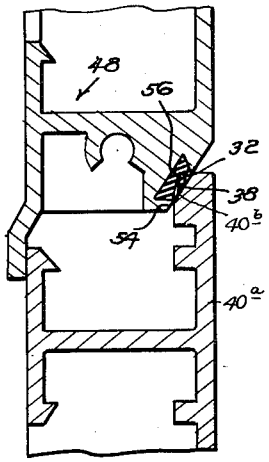
Figure 7 is a vertical sectional view illustrating the seal juncture between adjacent sash rails.

As clearly shown in Figure 7, the sash rail 40 is provided with a rearwardly spaced upstanding flange 40ª, the upper end of which is provided with a beveled surface 40ᵇ, against which the tongue 38 will have a sealing engagement.

It is to be understood that the action and function of the weather stripping element 30 is the same in each of many locations. Further, it is to be understood that the tongue portion 38 always projects in a direction opposite to the flow of air to provide the most effective seal.

It is to be understood that while a preferred form of the device has been illustrated, changes are contemplated as readily fall within the spirit of the invention as determined by the scope of the appended claim.

Having described the invention, what is claimed as new is:

In a metallic closure device that includes a frame having jambs that are connected by a sill and a header that is provided with a drip shield, sash swingable in the frame to have a weathering engagement with each other and a weathering engagement with the jambs, the sill and the drip shield, each of the sash including upper and lower rail members and connecting stiles, the said frame jambs being provided with outwardly open grooves and the drip shield being provided with an inwardly opening groove, each of the lower rail members being provided with an inwardly opening groove, weather stripping seated within the several grooves and with each weather stripping being provided with an outwardly angled tongue, the tongue of the weathering strip carried by the rails being angled in opposed relation to weathering faces formed upon the upper rails and a weathering face formed upon the sill, the tongues of the weather strips carried by the jambs being angled in opposed relation to weathering faces formed upon the stiles and the tongue of the weather strip carried by the drip shield being angled in opposed relation to a weathering face carried by the upper rail of the uppermost sash, the tongues being progressively flexed into the grooves when each sash is in the closed position, said tongues being angled in a direction facing the flow of air whereby the flow of air forces the tongues into firm sealing engagement with an adjacent weathering face, the said sash having a metal to metal contacting engagement with each other and with an area of the frame jambs, the sill and the drip shield at points adjacent to and parallel with the weather strips when in the closed position, the said grooves being of dovetail shape and with the weather stripping having a dovetail head that interlocks within the grooves, the said tongue being wedge shaped and normally biased outwardly toward an adjacent weathering face, the exposed face of the weather strips being inwardly grooved for the flush seating reception of the tongue when the sash are fully closed and in weathering engagement with the weathering faces and whereby to permit the metal to metal engagement at points closely parallel to the grooves of the weather strips.

References Cited in the file of this patent

UNITED STATES PATENTS

| | | |
|---|---|---|
| 818,764 | Hull | Apr. 24, 1906 |
| 1,804,787 | Kullmer | May 12, 1931 |
| 2,057,815 | Boehm | Oct. 20, 1936 |
| 2,122,608 | Harlow | July 5, 1938 |
| 2,654,921 | Blanchard | Oct. 13, 1953 |
| 2,767,813 | Blanchard | Oct. 23, 1956 |
| 2,779,068 | Blanchard | Jan. 29, 1957 |

FOREIGN PATENTS

| | | |
|---|---|---|
| 746,666 | France | June 2, 1933 |
| 704,230 | Great Britain | Feb. 17, 1954 |